(12) United States Patent
Kelly et al.

(10) Patent No.: US 8,749,545 B2
(45) Date of Patent: Jun. 10, 2014

(54) SPACE DEBRIS VISUALIZATION

(75) Inventors: Ryan Edward George Kelly, Arlington, VA (US); Felix Roach Hoots, Jr., Clifton, VA (US)

(73) Assignee: The Aerospace Corporation, El Segundo, CA (US)

( * ) Notice: Subject to any disclaimer, the term of this patent is extended or adjusted under 35 U.S.C. 154(b) by 1144 days.

(21) Appl. No.: 12/721,912

(22) Filed: Mar. 11, 2010

(65) Prior Publication Data

US 2011/0221751 A1 Sep. 15, 2011

(51) Int. Cl.
*G06T 15/00* (2011.01)
(52) U.S. Cl.
USPC .......................................... 345/419; 345/423
(58) Field of Classification Search
None
See application file for complete search history.

(56) References Cited

U.S. PATENT DOCUMENTS

| 6,757,612 | B1 * | 6/2004 | Talent et al. .................... 702/2 |
| 7,693,702 | B1 * | 4/2010 | Kerner et al. ................... 703/22 |
| 7,928,980 | B2 * | 4/2011 | Graziani et al. ............... 345/426 |
| 2005/0261580 | A1 * | 11/2005 | Willis et al. .................... 600/433 |
| 2011/0196550 | A1 * | 8/2011 | Carrico et al. ................... 701/13 |

OTHER PUBLICATIONS

Sorge, Marlon E., "Satellite Fragmentation Modeling with IMPACT," AIAA/AAS Astrodynamics Specialist Conference and Exhibit, Aug. 18-21, 2008, Honolulu, Hawaii, pp. 1-11.

* cited by examiner

*Primary Examiner* — Daniel Hajnik
*Assistant Examiner* — Andrew G Yang
(74) *Attorney, Agent, or Firm* — Sutherland, Asbill & Brennan LLP

(57) ABSTRACT

Certain embodiments of the invention may include systems and methods visualizing space debris events. According to an example embodiment of the invention, a method is provided for visualizing positional probability of objects in space. The method includes receiving initial conditions of the objects, determining projected positions of the objects based, at least in part, on the initial conditions, determining a plurality of 2-dimensional (2D) boundaries around the projected positions; and assembling the plurality of 2D boundaries into a 3-dimensional (3D) representation of the positional probability of objects in space.

18 Claims, 9 Drawing Sheets

SPACE DEBRIS VISUALIZATION

FIELD OF THE INVENTION

This invention generally relates to space debris, and more particularly, to visual representations of objects in space.

BACKGROUND OF THE INVENTION

Since the first satellite, Sputnik, was launched in 1957, thousands of additional satellites have been launched into space, but only about 10% of these satellites are currently active. Therefore, the earth is being orbited by a huge number of non-functional satellites, discarded rocket stages, and fragments formed from explosions or collisions with other spacecraft. It is estimated that over 40% of the debris objects in space have diameters less than 3 cm, yet such small objects can create significant impact damage to other satellites. Orbiting space debris is becoming an increasing problem for spacecraft operators.

The United States Space Surveillance Network tracks and catalogs any space debris larger than 5-10 cm in low earth orbit (within 2,000 km of earth's surface), and any space debris larger than 30 cm to 1 meter in the geostationary ring (about 35,800 km above the earth). There are currently over 11 space agencies around the world trying to address the problem of space debris. The agencies are addressing the problem, on one hand, by attempting to limit the space debris population growth, by limiting the number of objects that are launched into space, and, on the other hand, by taking steps to insure that the objects launched do not explode or collide with other objects to create more debris.

Databases have been developed to catalog breakup events and known space debris. Furthermore, sophisticated models exist for predicting the risk of debris collisions with other spacecraft. The models provide detailed risk assessments as a function of time, and the results are generally presented in tabular form. However, a need remains for improved systems and methods for visualizing space debris events.

BRIEF SUMMARY OF THE INVENTION

Some or all of the above needs may be addressed by certain embodiments of the invention. Certain embodiments of the invention may include systems and methods for visualizing space debris. Certain embodiments of the invention may include systems and methods for visualizing positional probabilities of objects in space.

According to an example embodiment of the invention, a method may be provided for visualizing positional probability of objects in space. The method may include receiving initial conditions of the objects, determining projected positions of the objects based, at least in part, on the initial conditions, determining a plurality of 2-dimensional (2D) boundaries around the projected positions; and assembling the plurality of 2D boundaries into a 3-dimensional (3D) representation of the positional probability of objects in space.

According to another example embodiment, a system may be provided for visualizing positional probability of objects in space. The system may include at least one memory for storing computer-executable instructions and initial condition data associated with the objects. The system also may include at least one processor in communication with the at least one memory, and further configured to execute the computer-executable instructions to receive initial condition data associated with the objects, determine projected positions of the objects based at least in part on the initial condition data, determine a plurality of 2D boundaries around the projected positions; and assemble the plurality of 2D boundaries into a 3D representation of the positional probability of objects in space.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying figures, plots, block diagrams, and flow diagrams, which are not necessarily drawn to scale, and wherein.

DETAILED DESCRIPTION OF THE INVENTION

Figure 1:
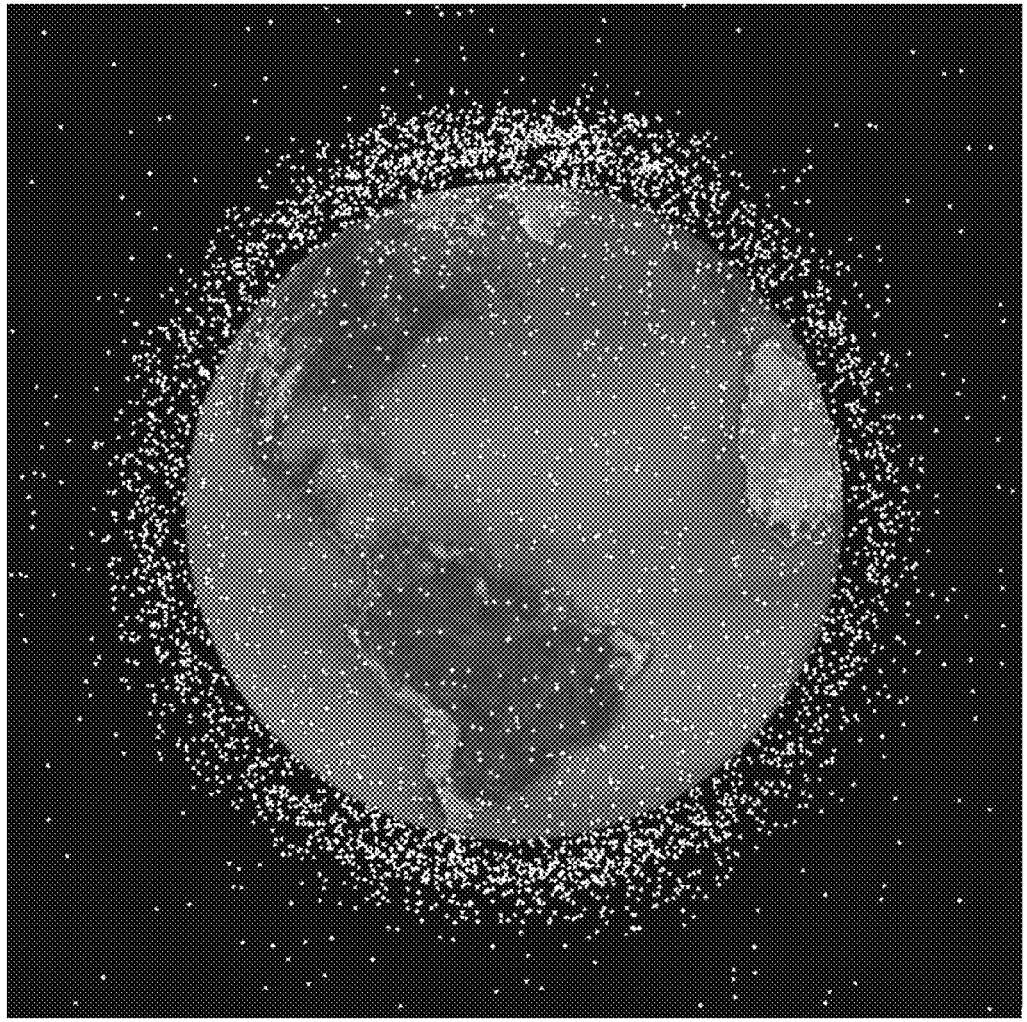
FIG. 1 is a representation of a prior art space debris visualization.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In example embodiments of the invention, visualization of space debris may be presented as a "cloud" and risk level may be portrayed in a 3-dimensional (3D) time varying visual representation. The visualization may portray both the physical extent of the debris cloud as well as the relative density of debris particles within the cloud. As time progresses, the cloud shape may spread and the debris may disperse, wherein the visualization representation may become more transparent, and tend toward the cooler colors, for example, to indicate less dense regions of debris. According to example embodiments, the visualization data files may be formulated to run with existing animation tools.

Embodiments of the invention may portray the debris as a cloud with the proper physical dispersion, colored or shaded in a manner to indicate relative density, and associated collision risk with other space objects. According to example embodiments, the representative cloud may change shape, color, and transparency as the physical debris field evolves in time, providing intuitive insight into the nature of the debris cloud as well as revealing some physical properties of the cloud, which may not be apparent by viewing an ensemble of particles.

Certain embodiments of the invention may enable visualizing space object probable positions in space. According to example embodiments, the space objects may include space debris and/or space craft. According to certain example embodiments, aspects of the invention may enable visualizing probable orbits of the space object. According to example embodiments, the invention may provide a visual representation of 2-dimensional (2D) boundaries, and/or 3D probabilities of space objects positions. The 2D boundaries may represent statistical estimates of a percentage of the objects enclosed within the boundary. In example embodiments of the invention, visual indicators, including coloration and/or transparency, may be utilized to represent positional location or density probability or flux of the objects.

According to example embodiments of the invention, output from standard breakup models (e.g. IMPACT) may be used to generate a 3D outer boundary of the breakup cloud. This outer boundary may evolve into a torus around the earth model, and the shape of the torus may or may not be symmetric, but will most likely be complex because of the pinch point region and subsequent dynamics of the debris cloud. Thus, creating a 3D model of this complex, time varying shape is one aspect of the invention. A further complication involves the difficulty in getting a computer to recognize the pattern of a boundary given a discrete set of points. For example, computer-based pattern recognition techniques such as facial recognition require complicated algorithms and significant processing power. In the case of space debris visualization, the problem can be multiple orders of magnitude more complex in terms of required data processing, because the debris distribution patterns may be complex and asymmetrical.

According to another example embodiment of the invention, a Poincare section may be utilized to find a bounding closed curve and the associated area of the cross section at multiple slices around the torus. In example embodiments, pattern recognition routines may be utilized to determine boundary curves, and the boundaries may form the framework for development of the 3D representation of the debris cloud. According to an example embodiment of the invention, surface bounding polygons may be utilized to compute volume, debris density, and debris flux data appropriate for use in coloration and transparency calculations. The coloration and transparency calculations may then shade and color the torus surface appropriately.

According to another embodiment or aspect of the invention, a connectivity matrix may be generated. The connectivity matrix may be commonly referred to as a mesh grid. According to example embodiments, this connectivity matrix may control the renderer in the graphics hardware or software dictating where to draw the surfaces, the levels of color and the translucency to apply to the torus model.

According to another embodiment or aspect of the invention, data arrays suitable for use in existing 3D visualization tools may be generated. In accordance with embodiments of the invention, a balance between fidelity of the model with a tradeoff for run speed may be controlled for the particular needs of the visualization.

Various systems and methods for creating space debris event visualization, according to example embodiments of the invention, will now be described with reference to the accompanying figures.

FIG. 1 illustrates an example prior art representation of space debris. Previous attempts at debris visualizations have displayed a representative sample of the debris particles as discrete pixel-size objects. In this figure, the scale is such that even small pixels may represent objects many orders of magnitude larger than the actual size of debris. Thus, such a portrayal may give an unnecessarily pessimistic view of the debris density in space. Such methods may give the viewer a false impression that the particles actually represent the precise location of a piece of debris in space. However, the space debris models are statistical in nature, and the particles are representative of a location probability. Therefore, according to example embodiments of the invention, continuous 3D models may be utilized to represent the density of particles, though no actual particles appear in the visualization, thereby completely avoiding a false impression of positional knowledge or particle size.

Figure 2:
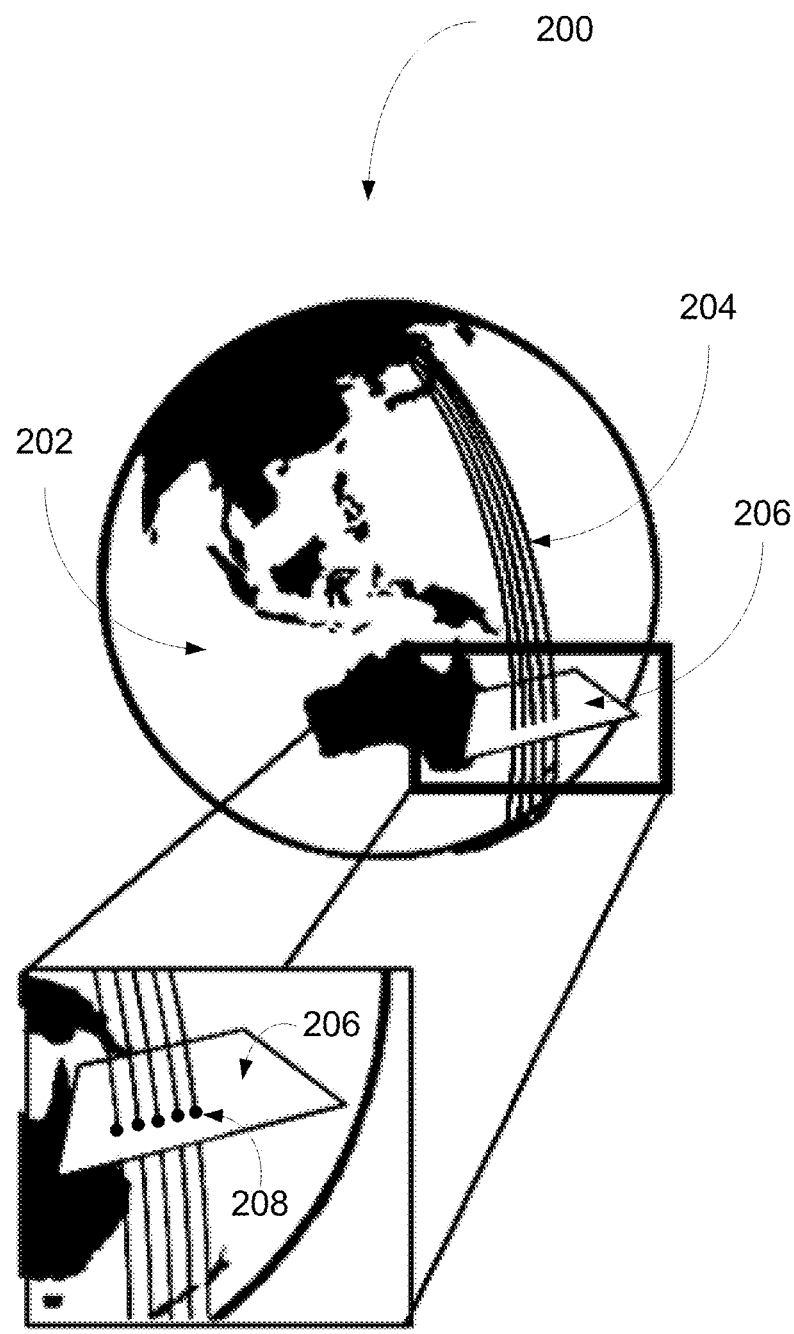
FIG. 2 is an illustration of space debris probable positions and orbits, according to example embodiments of the invention.

According to example embodiments of the invention, FIG. 2 shows an illustration 200 of space debris orbits 204 around the globe 202, where the space debris orbits 204 intersect a 2D Poincare section 206 at an angle approximately normal to the surface of the Poincare section 206. The intersection points 208, where the space debris orbits 204 intersect the Poincare section 206, may be determined for a plurality of Poincare section 206 around the globe 202, and a plurality of Poincare section 206 with intersection points 208 may be utilized for determining 3D representations of the debris positional and density probabilities. In an example embodiment, taking a plurality of Poincare sections 206 spaced around the globe 202 may give insight into how the debris cloud cross section changes around the orbit.

In certain example embodiments, the intersection points 208 may form complex shapes that are not readily described in terms of primitive shapes (for example, circles, squares, or triangles), and therefore, standard curve fitting methods may fail to properly represent the collection of intersection points 208.

Figure 3:
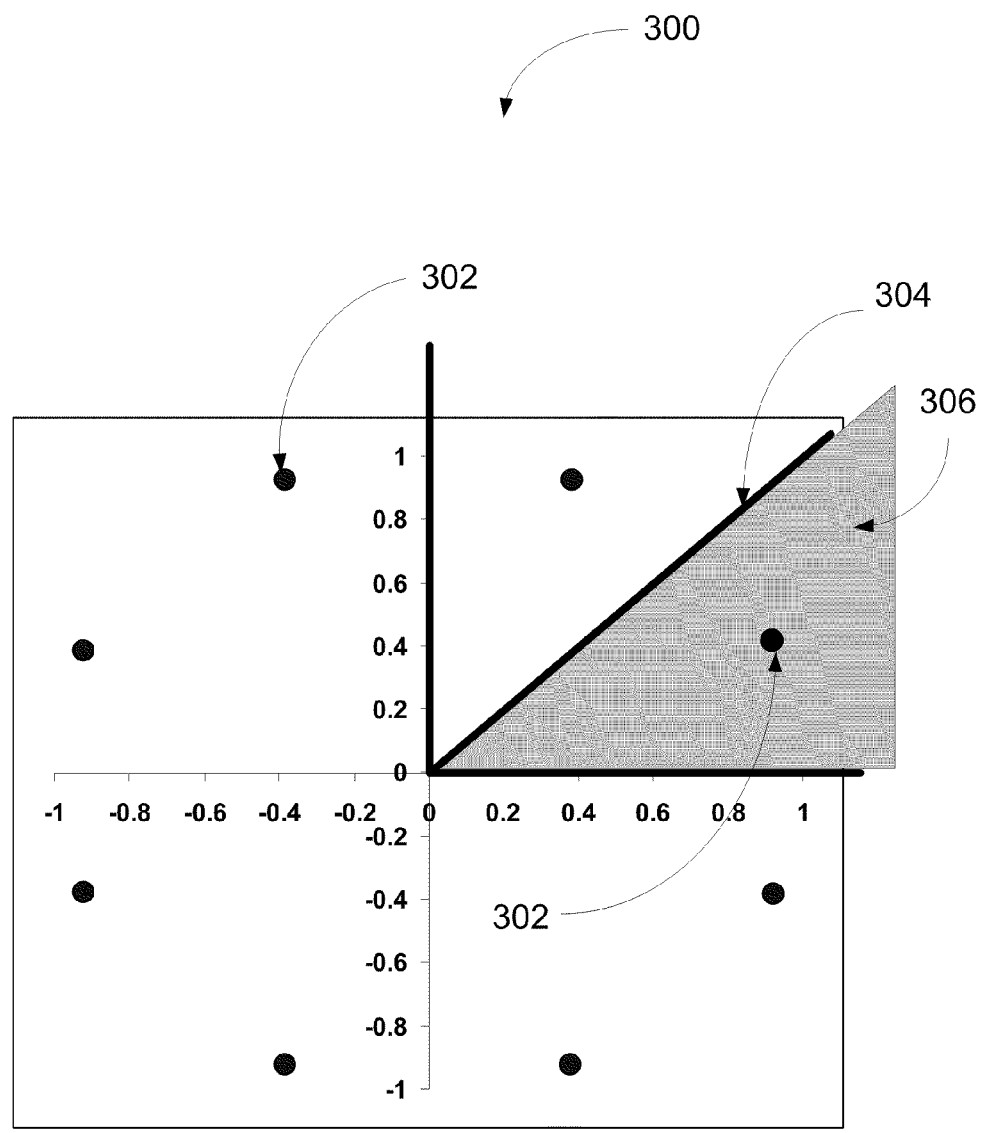
FIG. 3 is a plot representative of space debris positions, according to example embodiments of the invention.

FIG. 3 depicts a simplified example plot of space debris intersection points 302 for a single Poincare section 300, taken around the globe 202. The space debris intersection points 302 may be generated by predicting each piece of debris around one revolution and noting where it passes through the surface of the Poincare section 300. According to example embodiments of the invention, enveloping curves may be computed by dividing the Poincare section 300 into angular regions 306 around the Poincare section 300. The radius to the enveloping curve for region 306 is determined by searching the angular subspace 306 to determine the point farthest from the center. This radius defines the boundary point for this region 306. By smoothly connecting the boundary points of all regions 306, a closed curve may be obtained that envelopes the plurality of space debris intersections points 302 for this Poincare section 300. (Additional details for how the envelope may be calculated can be found below with reference to FIG. 8). In accordance with example embodiments of the invention, enveloping curves may be based on the maximum number of space debris intersection points 302 within each region 306.

Figure 4:
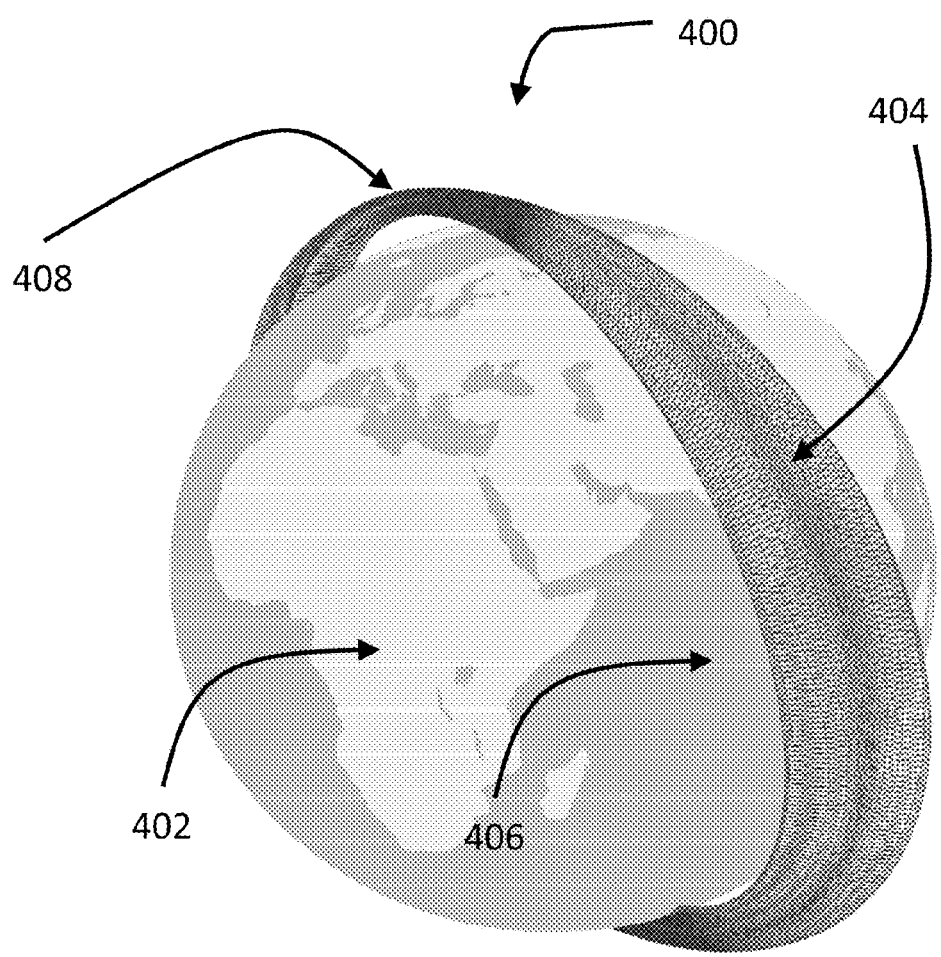
FIG. 4 is a pictorial representation of a space debris orbital mesh, according to example embodiments of the invention.

FIG. 4 is a 3D pictorial representation 400 of a globe 402 encircled by a space debris orbital mesh 404, according to example embodiments of the invention. The orbital mesh 404 may be calculated and generated as described above. According to example embodiments, the orbital mesh 404 may represent a variable flux density of particles. For example, the orbital mesh 404 may represent both concentrated regions 408 (high particle flux density) and expanded regions 406 (low particle flux density), and other regions in between having various sizes and shapes determined from enveloping curves and boundary points and based on predicted particle data. The orbiting debris positional probability may be confined to a smaller cross section of space in the concentrated regions 408, and may be more spread out in the expanded regions 406.

Figure 5:
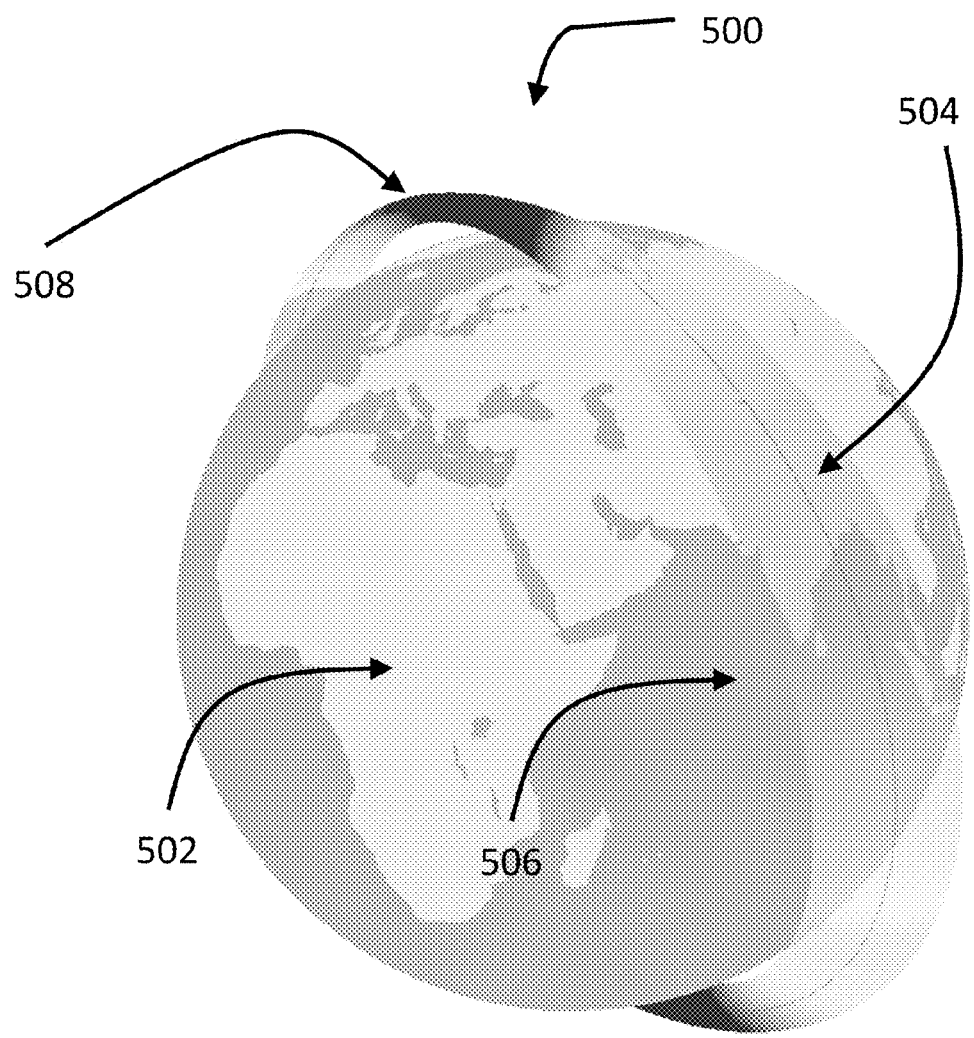
FIG. 5 is pictorial representation of space debris probable density, according to example embodiments of the invention.

In example embodiments of the invention, the cross sectional area of the orbital mesh 404 may be utilized to compute the space debris particle density. The position and density of particles may be represented using various visual indicators, including coloration, shading, volume, shape, transparency, etc. For example, FIG. 5 shows a 3D pictorial representation 500 of a globe 502 encircled by a graphical representation 504 of the space debris particle density. The graphical representation 504 of the space debris particle density in FIG. 5 is shown in black and white but, according to example embodiments of the invention, may include coloration, shading, volume, shape, transparency, etc. to represent the particle density or probable density and position. For example, the graphical representation 504 of the space debris particle density may include concentrated regions 508, expanded regions 504, and other regions having various sizes and shapes determined from enveloping curves and boundary points and based on received particle data. These regions 508, 504 may be represented by, for example, a high degree of transparency in the expanded regions 504, indicating low particle probable density (or flux), and a high degree of opacity in the concentrated regions 508, indicating a relatively high particle probable density (or flux).

According to other example embodiments, combinations of coloration, shading, volume, shape, transparency, etc. may simultaneously be utilized to provide visual indicators representative of the particle probable density. In one example embodiment of the invention, the concentrated regions 508, for example, may be colored red, and the region may be fairly opaque, whereas an expanded region 506 may be represented by another color (blue for example), and my have a high degree of transparency. The transition regions between the expanded regions 506 and the concentrated regions 508 may be represented by gradual changing colors (for example violets to reds) and gradual changing transparencies (about 100% to about 0% for example) to represent the corresponding particle probable densities throughout the graphical representation 504 of the space debris particle density.

Figure 6:
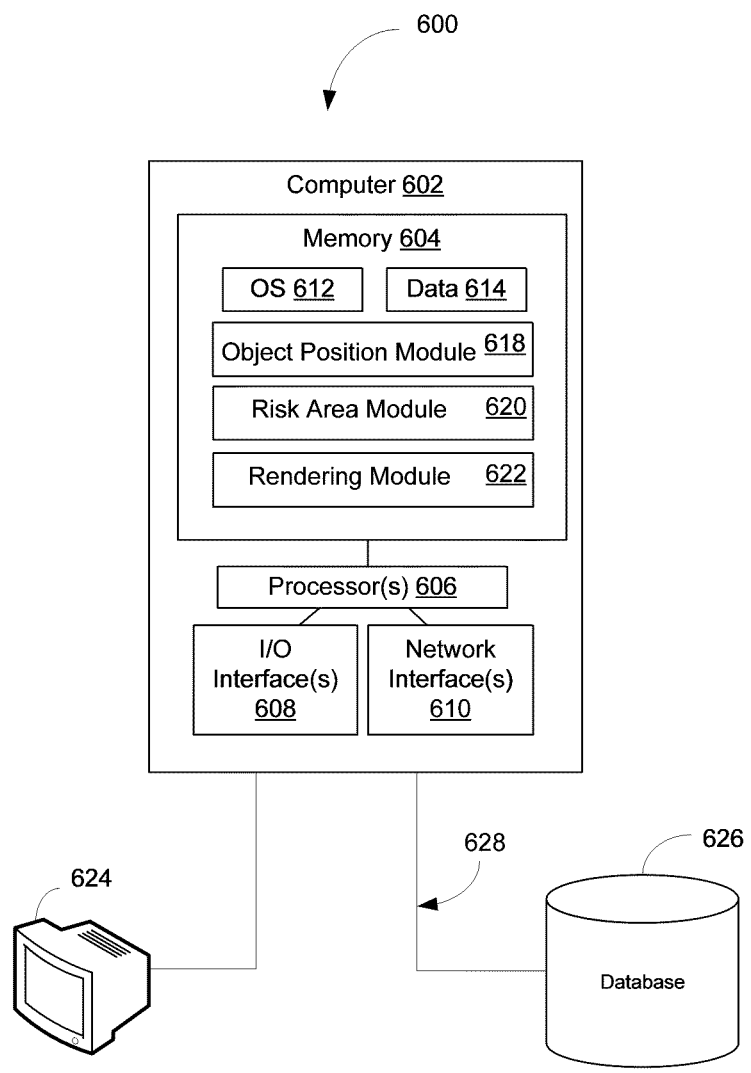
FIG. 6 is a block diagram of a space debris visualization system, according to example embodiments of the invention.

An example system 600 for visualizing positional probability of objects in space will now be described with reference to the block diagram of FIG. 6. The system 600 may include a computer 602 having at least one memory 604 and one or more processors 606 in communication with the at least one memory 604. According to example embodiments, the one or more processors 606 may also be in communication with input/output interfaces 608. In example embodiments, the one or more processors 606 may also be in communication with one or more network interfaces 610. The one or more processors 606 may be in communication with a display 624 for visualizing the rendered results. According to example embodiments, one or more processors 606 may be in communication with one or more databases 626. In example embodiments, the one or more databases 626 may be utilized for storing and retrieving space debris particle data 628, which may include particle initial velocity and/or position. According to example embodiments, the one or more processors 606 may be programmed to, configured to, or operable to retrieve particle data 628 from the one or more databases 626, which may be accessible internally, or externally via the input/output interface 608, or via a network interface 610.

According to example embodiments of the invention, the at least one memory 604 may include an operating system 612 and data 614. The memory may also include an object position module 618, a risk area module 620, and/or a rendering module 622. The one or more processors 606 may be programmed to, configured to, or operable to utilize the particle data 628 in conjunction with the modules 618, 620, 622 to produce a visual rendering of the space debris particle density for display on one or more displays 624. According to an example embodiment of the invention the display 624 may include a virtual reality display, a regular computer monitor, or any suitable viewing device.

In an example embodiment of the invention, the object position module 618 may be utilized to produce positional probabilities of space debris objects based on particle data 628, which may include particle initial velocity and/or position. The object position module 618 may also include time, trajectory, and/or known orbit information to produce the positional probabilities of space debris objects.

In example embodiments of the invention, the risk area module 620 may be utilized to generate and/or refine the positional probabilities of the space debris objects generated by object position module 618. In an example embodiment, the risk area module 620 may analyze a plurality of Poincare sections, as described previously, to produce data representing the risk of encountering particles or objects in a particular region of space. In example embodiments of the invention, the rendering module 622 may utilize the data generated by the risk area module 620 to produce visual indicators, including coloration, shading, volume, shape, transparency, opacity, etc. for visualization on the display 623.

In example embodiments, any combination of the modules 618, 620, and/or 622 may be utilized to provide different representations or views of the positional probabilities of the space debris objects. For example, an operator may pan, zoom, and navigate within a 3D rendering of the particle positional probabilities to assess the risk of collisions. In other embodiments of the invention, the 3D rendering may be animated.

Figure 7:
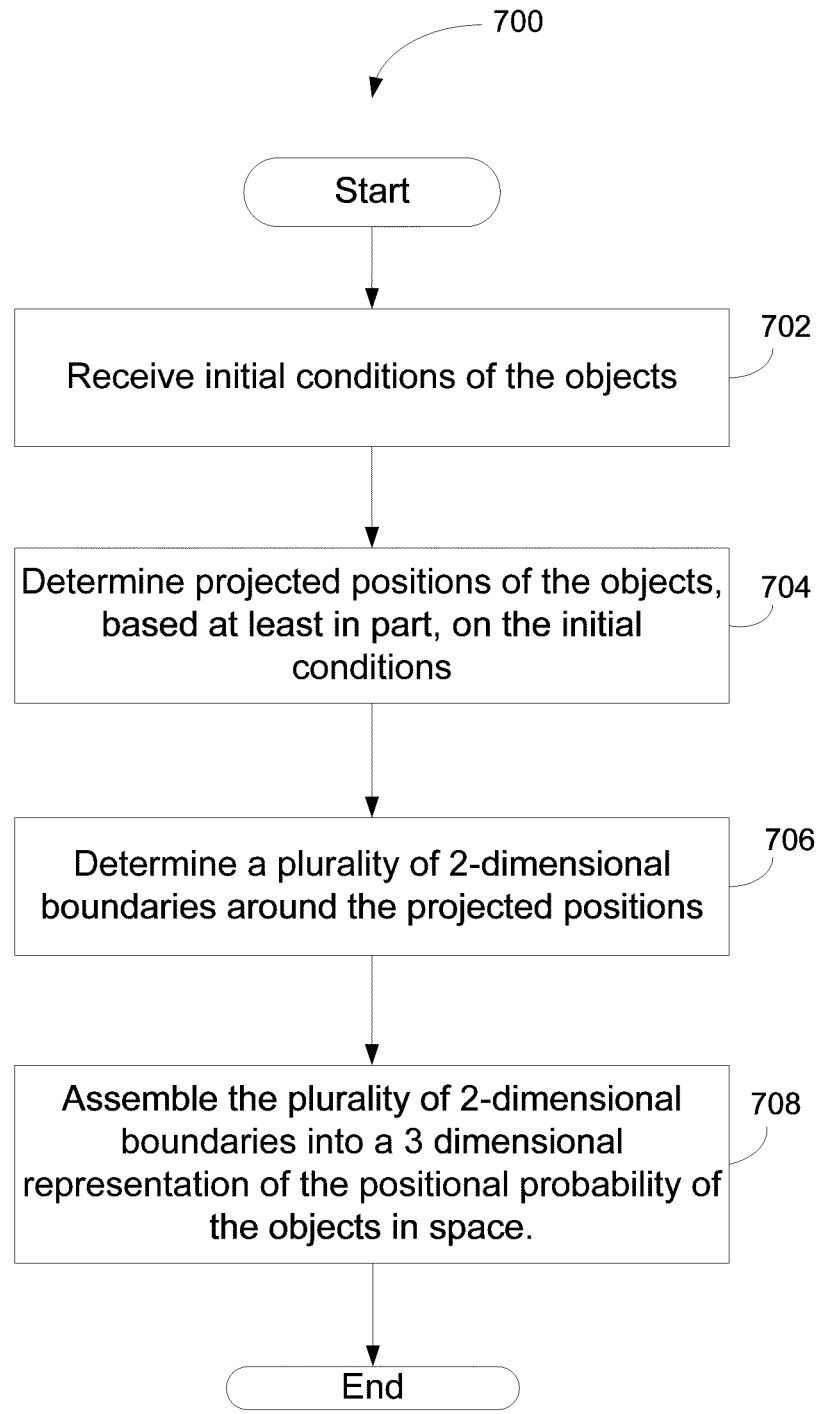
FIG. 7 is a flow diagram of an example method according to an embodiment of the invention.

FIG. 7 is a flow diagram of an example method 700 for visualizing the positional probability of objects in space, according to an example embodiment of the invention. In block 702, the method includes receiving initial conditions of the objects. In block 704, the method includes determining projected positions of the objects based, at least in part, on the initial conditions. In block 706, the method includes determining a plurality of 2D boundaries around the projected positions. In block 708, the method includes assembling the plurality of 2D boundaries into a 3D representation of the positional probability of objects in space.

According to certain embodiments of the invention, 2D boundaries may be utilized to encompass the probable position of the objects, and the 2D boundaries may be utilized to facilitate the calculation of density and flux probability of the objects. In certain embodiments of the invention, 2D boundaries or the 3D representations may comprise one or more visual indicators representative of one or more of positional location or density probability or flux of the objects, wherein the visual indicators may comprise one or more of color, shading, volume, shape, transparency or opacity. In certain example embodiments of the invention, the 2D boundaries or the 3D representations may be utilized to identify potential collision threats or probable collisions. In example embodiments of the invention, the 2D boundaries or the 3D representations may be based, at least in part on time-dependent positional probabilities of the objects in space. In certain embodiments of the invention, the objects may represent space debris or satellites.

Figure 8:
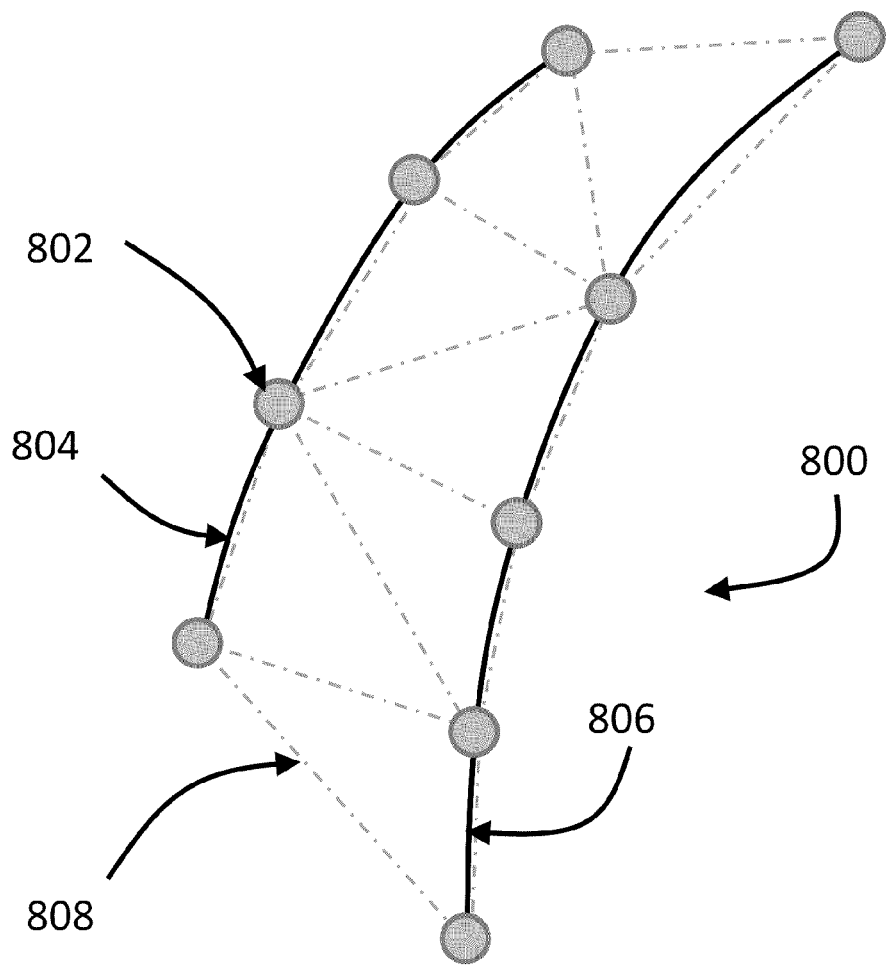
FIG. 8 is a diagram illustrating connectivity meshing of two-dimensional Poincare sections into a three-dimensional surface.

According to example embodiments, enveloping curves may be utilized to define boundary points, and the boundary points may be connected together via edges to create a 3D bounding mesh surface, or an orbital mesh. The meshing process may be automated, and may utilize nearest-neighbor triangulation. In an example embodiment, the nearest neighbors for each point on the boundary sections may be computed and recorded. An example of this process is shown in FIG. 8. Given boundary points 802, a closed 2D boundary curve 804 may be connected, or 'meshed' with a neighboring boundary curve 806 via nearest-neighbor connectivity edges 808. A matrix comprising this connectivity information may then be created, stored, and utilized in the graphical rendering process to dictate the drawing of graphical primitives.

Figure 9:
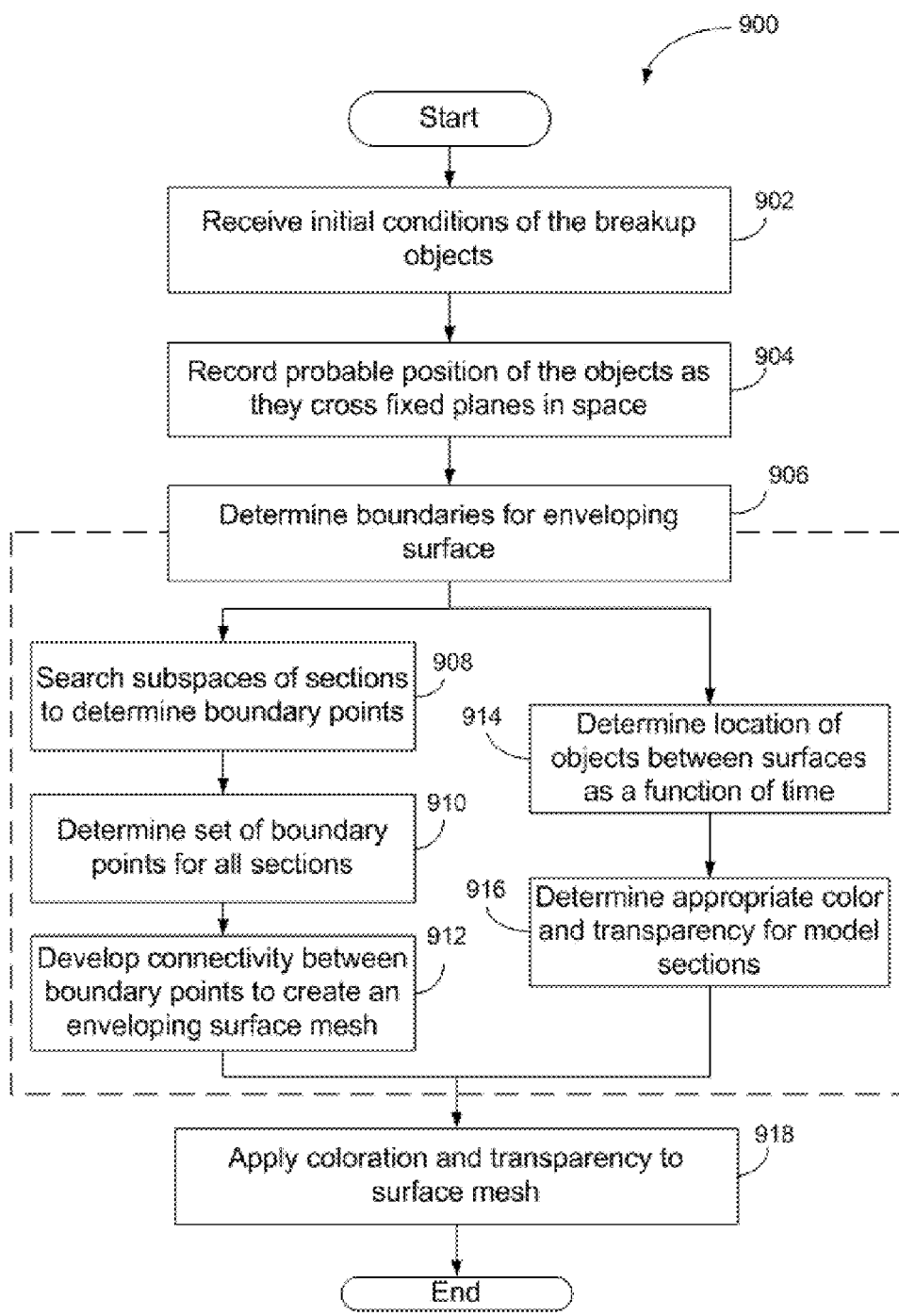
FIG. 9 is a flow diagram for providing visual representations of positional probability of objects in space.

FIG. 9 is flow diagram of another example method 900 for calculating and providing visual representations of the positional probability of objects in space, according to an example embodiment of the invention. In block 902, the initial conditions of breakup objects may be received. In block 904, the probable positions of the objects are recorded as they cross fixed planes in space. In block 906, boundaries for an enveloping surface are determined. Block 906 may include blocks 908, 910, 912, 914, and 916 in the process of determining boundaries for the enveloping surfaces. In block 908, section subspaces are searched to determine boundary points. In block 910, a set of boundary points are determined for all sections. In Block 912, connectivity is developed between boundary points to create an enveloping surface mesh. In block 914, the locations of objects between surfaces are determined as a function of time. In block 916, the appropriate color and transparency for model sections is determined. In block 918 color and transparency is applied to the surface mesh.

Accordingly, example embodiments of the invention can provide the technical effects of creating certain systems and methods that provide visualizations of the risk of collision with space objects. Example embodiments of the invention can provide the further technical effects of providing systems and methods for developing a 3D boundary for a debris cloud suitable for visualization and further technical analysis. Example embodiments of the invention can provide the further technical effects of providing systems and methods for using transparency and coloration to convey intuitive sense of collision risk based on technical analysis. Example embodiments of the invention can provide the further technical effects of providing systems and methods for a visualization model that evolves with time, as dictated by dynamics of the model. Example embodiments of the invention can provide the further technical effects of providing systems and methods for generating and rendering multiple distinct surfaces in the same simulation to demonstrate relative risk between two separate debris fields or breakup events.

In example embodiments of the invention, the system 600 for visualizing positional probability of objects in space may include any number of software applications that are executed to facilitate any of the operations.

In example embodiments, one or more input/output interfaces may facilitate communication between the system 600 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc. may facilitate user interaction with the system 600. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the system 600 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc. for communication with external devices and/or systems. As desired, embodiments of the invention may include the system 600 with more or less of the components illustrated in FIG. 6.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for visualizing positional probability of objects in outer space, the method comprising:
    receiving, by a computer comprising one or more processors, initial conditions of the objects, wherein the objects represent one or more of satellites or space debris;
    determining, by the computer, projected positions of the objects based, at least in part, on the initial conditions;
    determining, by the computer based at least in part on the projected positions, a first 2-dimensional (2D) section that intersects the projected positions at a first set of intersection points, and a second 2D section that intersects the projected positions at a second set of intersection points;
    determining, by the computer, a first 2D boundary curve within the first 2D section, the first 2D boundary curve surrounding the first set of intersection points;
    determining by the computer, a second 2D boundary curve within the second 2D section, the second 2D boundary curve surrounding the second set of intersection points;
    generating, by the computer, one or more connection edges between the first 2D boundary curve and the second 2D boundary curve; and
    assembling, by the computer based at least in part on the one or more connection edges, a 3-dimensional (3D) representation of the positional probability of the objects in outer space.

2. The method of claim 1, wherein the first 2D boundary curve facilitates the calculation of density and flux probability of the objects.

3. The method of claim 1, wherein the initial conditions comprise at least one of an initial velocity or an initial position.

4. The method of claim 1, wherein the first 2D boundary curve or the 3D representation comprise one or more visual indicators representative of one or more of: positional location, density probability, or flux of the objects, wherein the visual indicators comprise one or more of color or transparency.

5. The method of claim 1, further comprising using the first 2D boundary curve or the 3D representations to identify potential collision threats or probable collisions.

6. The method of claim 1, further comprising updating the first 2D boundary curve or the 3D representations based at least in part on time-dependent positional probabilities of the objects in space.

7. The method of claim 1, further comprising animating the 3D representations.

8. A system for visualizing positional probability of objects in outer space, the system comprising:
    at least one memory for storing computer-executable instructions and initial condition data associated with the objects, wherein the objects represent one or more of satellites or space debris;
    at least one processor in communication with the least one memory, and further configured to execute the computer-executable instructions to:
    receive initial condition data associated with the objects;
    determine projected positions of the objects based at least in part on the initial condition data;
    determine, based at least in part on the projected positions, a first 2-dimensional (2D) section that intersects the projected positions at a first set of intersection points, and a second 2D section that intersects the projected positions at a second set of intersection points;
    determine, a first 2D boundary curve within the first 2D section, the first 2D boundary curve surrounding the first set of intersection points;
    determine a second 2D boundary curve within the second 2D section, the second 2D boundary curve surrounding the second set of intersection points
    generate one or more connection edges between the first 2D boundary curve and the second 2D boundary curve; and
    assemble, based at least in part on the one or more connection edges, a 3-dimensional (3D) representation of the positional probability of objects in outer space.

9. The system of claim 8, wherein the at least one processor is further operable to access one or more local or remote databases in which the initial conditions are stored.

10. The system of claim 8, wherein the initial conditions comprise at least one of an initial velocity or an initial position.

11. The system of claim 8, wherein the first 2D boundary curve or the 3D representations comprise visual indicators representative of one or more of positional location or density probability or flux probability of the objects, wherein the visual indicators comprise one or more of color or transparency.

12. The system of claim 8, wherein the first 2D boundary curve or the 3D representations represent potential collision threats or probable collisions.

13. The system of claim 8, wherein the first 2D boundary curve or 3D representations are updated based at least in part on time-dependent positional probabilities of the objects in space.

14. The system of claim 8, wherein the at least one processor is further configured to animate the 3D representations.

15. The method of claim 1, wherein determining the first 2D boundary curve comprises:
    dividing the first 2D section into a plurality of angular subspaces;
    calculating one or more boundary points associated within the angular subspaces; and
    connecting the one or more boundary points to form the first 2D boundary curve.

16. The method of claim 15, wherein calculating the one or more boundary points comprises determining, for respective angular subspaces of the plurality of angular subspaces, a farthest position from a center of the respective angular subspaces.

17. The system of claim 8, wherein the at least one processor is further configured to execute the computer-executable instructions to:
- divide the first 2D section into a plurality of angular subspaces;
- calculate one or more boundary points associated with the angular subspaces; and
- connect the one or more boundary points to form the first 2D boundary curve.

18. The system of claim 17, wherein the computer-executable instructions to calculate the one or more boundary points further comprise instructions to:
- determine, for respective angular subspaces of the plurality of angular subspaces, a farthest position from a center of the respective angular subspaces.

* * * * *